United States Patent
Choi et al.

(10) Patent No.: US 8,926,155 B2
(45) Date of Patent: Jan. 6, 2015

(54) BACKLIGHT ASSEMBLY AND DISPLAY APPARATUS HAVING THE SAME

(75) Inventors: Chul-Hyun Choi, Yongin-si (KR); Kwang-Hoon Lee, Anyang-si (KR); Se-Ki Park, Ansan-si (KR)

(73) Assignee: Samsung Display Co., Ltd., Yongin (KR)

( * ) Notice: Subject to any disclaimer, the term of this patent is extended or adjusted under 35 U.S.C. 154(b) by 188 days.

(21) Appl. No.: 13/592,740

(22) Filed: Aug. 23, 2012

(65) Prior Publication Data
US 2013/0272022 A1 Oct. 17, 2013

(30) Foreign Application Priority Data
Apr. 16, 2012 (KR) ........................ 10-2012-0039321

(51) Int. Cl.
*F21V 13/12* (2006.01)
(52) U.S. Cl.
USPC ........................................ 362/606; 362/609
(58) Field of Classification Search
USPC ................................................ 362/606, 609
See application file for complete search history.

(56) References Cited

U.S. PATENT DOCUMENTS

| | | |
|---|---|---|
| 2006/0181901 A1 | 8/2006 | Sakai et al. |
| 2009/0262517 A1 | 10/2009 | Suehiro et al. |
| 2010/0246213 A1 | 9/2010 | Naijo |
| 2011/0128756 A1 * | 6/2011 | Cho et al. ..................... 362/606 |

FOREIGN PATENT DOCUMENTS

| | | |
|---|---|---|
| EP | 1653149 | 5/2006 |
| JP | 2000-315056 | 11/2000 |
| KR | 1020070064752 | 6/2007 |
| KR | 1020110014046 | 2/2011 |
| WO | 02/29314 | 4/2002 |

OTHER PUBLICATIONS

Extended European Search Report issued in EP Application No. 12184413 on Jul. 29, 2013.

* cited by examiner

*Primary Examiner* — Elmito Breval
(74) *Attorney, Agent, or Firm* — H.C. Park & Associates, PLC

(57) ABSTRACT

In a backlight assembly and a display apparatus having the backlight assembly, the backlight assembly includes a light source, a light guide, a first reflector, and an optical unit. The light guide is disposed adjacent to the light source, extends substantially parallel with a longitudinal direction of the light source, and refracts light emitted from the light source. The first reflector is disposed under the light guide and reflects the refracted light toward the optical unit. The optical unit is disposed over the first reflector such that an empty space is formed between the optical unit and the first reflector.

19 Claims, 8 Drawing Sheets

BACKLIGHT ASSEMBLY AND DISPLAY APPARATUS HAVING THE SAME

This application claims priority from and the benefit of Korean Patent Application No. 10-2012-0039321, filed on Apr. 16, 2012, which is hereby incorporated by reference for all purposes as if fully set forth herein.

BACKGROUND

1. Field

Exemplary embodiments of the present invention relate to a backlight assembly and a display apparatus having the backlight assembly.

2. Discussion of the Background

Generally, a display apparatus includes a backlight assembly and a display panel. The backlight assembly emits light, and the display panel displays an image using the light from the backlight assembly. A light source may be disposed at a side portion of the backlight assembly, which is called as an edge-illumination type backlight assembly, to decrease the thickness of a display apparatus.

The edge-illumination type backlight assembly includes a light guide plate and a reflective plate. The light guide plate guides the light from the light source disposed at the side of the light guide plate. The reflective plate is disposed under the light guide plate and reflects the light to the display panel. Recently, a newly developed structure of the display apparatus does not include the light guide plate, to decrease the weight of a display apparatus and maintain a uniformity of luminance.

However, in an edge-illumination type backlight assembly not having the light guide plate, since a light emitting diode (LED) is mainly used as the light source, which is a point light source providing the light to all directions, a light-emitting direction of the LED should be focused onto the display panel, to increase the uniformity of luminance.

Thus, a specially designed structure has been developed to decrease an angle of the light emitted from an LED. However, such a structure results in increased bezel thickness and/or increased display apparatus thickness. In addition, heat from an LED is hard to dissipate.

BRIEF SUMMARY OF THE INVENTION

Exemplary embodiments of the present invention provide a backlight assembly having increased luminance uniformity.

Exemplary embodiments of the present invention also provide a display apparatus including the backlight assembly.

An exemplary embodiment of the backlight assembly includes a light source, a light guide, a first reflector, and an optical unit. The light guide is disposed adjacent to the light source, extends substantially parallel with a longitudinal direction of the light source, and refracts light emitted from the light source. The first reflector is disposed under the light guide, and reflects the refracted light toward the optical unit. The optical unit is disposed over the first reflector such that an empty space is formed between the optical unit and the first reflector.

Exemplary embodiments of the present invention provide a display apparatus that includes a display panel, a mold frame, a backlight assembly and a container. The display panel displays an image using light. The mold frame supports the display panel. The backlight assembly is disposed under the display panel and provides the light to the display panel. The container is disposed under the backlight assembly, and receives the display panel, the mold frame and the backlight assembly. The backlight assembly includes a light source, a light guide, a first reflector and an optical unit. The light source emits light. The light guide is disposed adjacent to the light source, extends substantially parallel with a longitudinal direction of the light source, and refracts the light from the light source. The first reflector is disposed under the light guide, and reflects the light refracted from the light source toward an upper direction. The optical unit is disposed over the first reflector so that a vacant space is formed between the optical unit and the first reflector.

According to the exemplary embodiments of the present invention, the light guide is disposed adjacent to the light source and refracts the light from the light source, and thus an angle of a light-emitting direction of the light source may be decreased. Thus, luminance of the light provided to the display panel may be more uniform.

In addition, in an air guide structure, in which a light guide plate is omitted and a vacant space is formed between the optical and the first reflector, the angle of the light-emitting direction is decreased, and thus, the light is uniformly provided to the first reflector. Thus, the luminance of the light provided to the display panel may be more uniform.

In addition, a distance between the light source and the light guide, a shape of the light guide, and so on, may be changed to change a focal distance of the light passing through the light guide. Thus, the luminance may be adjusted based on the structure and the size of the display apparatus.

In addition, the second reflector is disposed between the light guide and the optical to block the light from passing through the light guide and being radiated upward. Thus, hot-spots may be prevented.

In addition, an upper surface of the light guide makes contact with a lower surface of the optical unit and supports the optical. Thus, the display apparatus may have improved structural stability.

In addition, the light guide is formed at an inner portion of the light source, and thus, the luminance may be more uniform, without increasing the thickness of a bezel.

In addition, both ends of the light guide are fixed by the mold frame, the container, or the cover portion. Thus, an additional fixing element may be omitted. Further, the display apparatus may have improved structural stability due to a simplified fixing element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
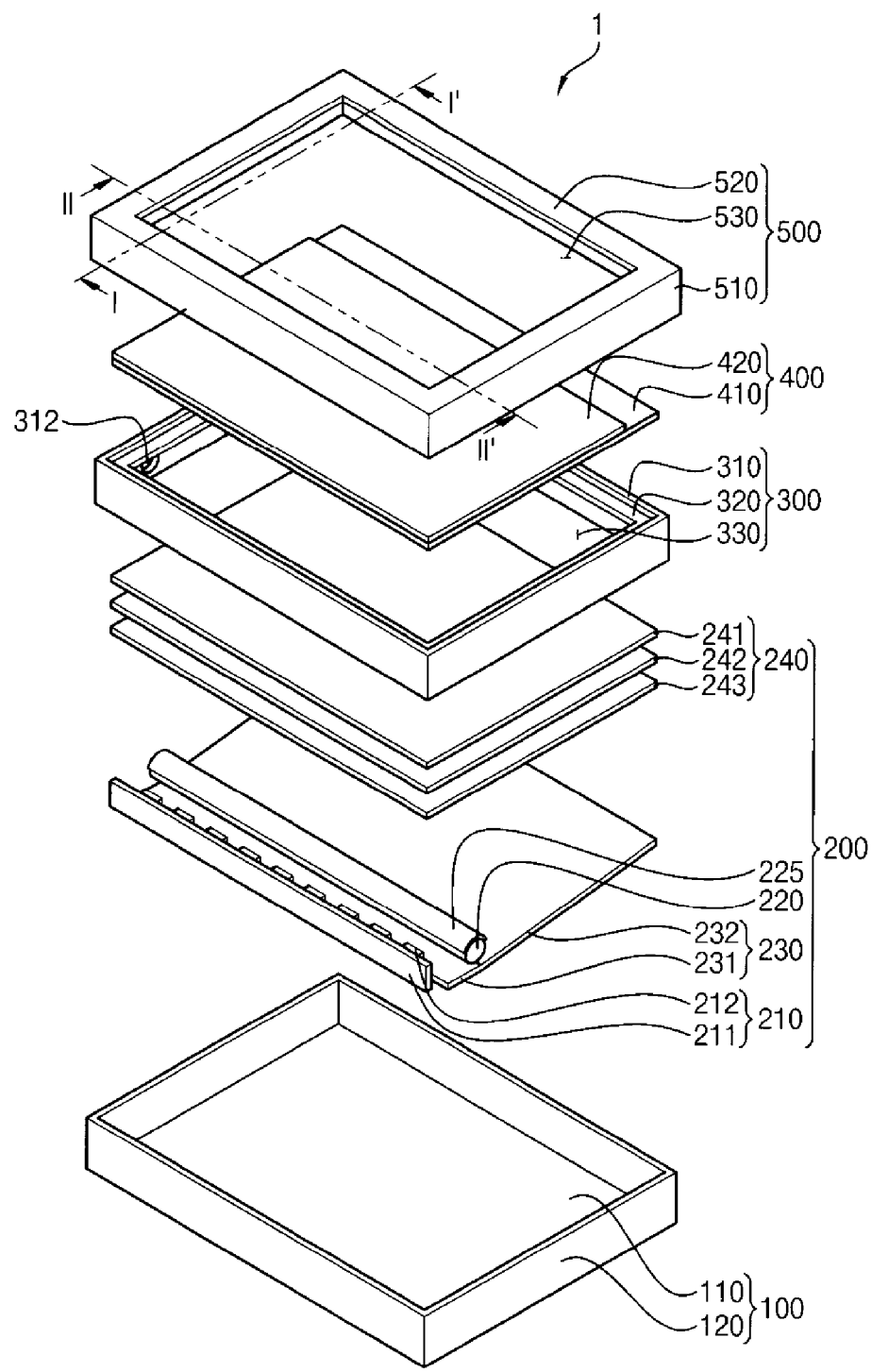
FIG. 1 is an exploded perspective view illustrating a display apparatus according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
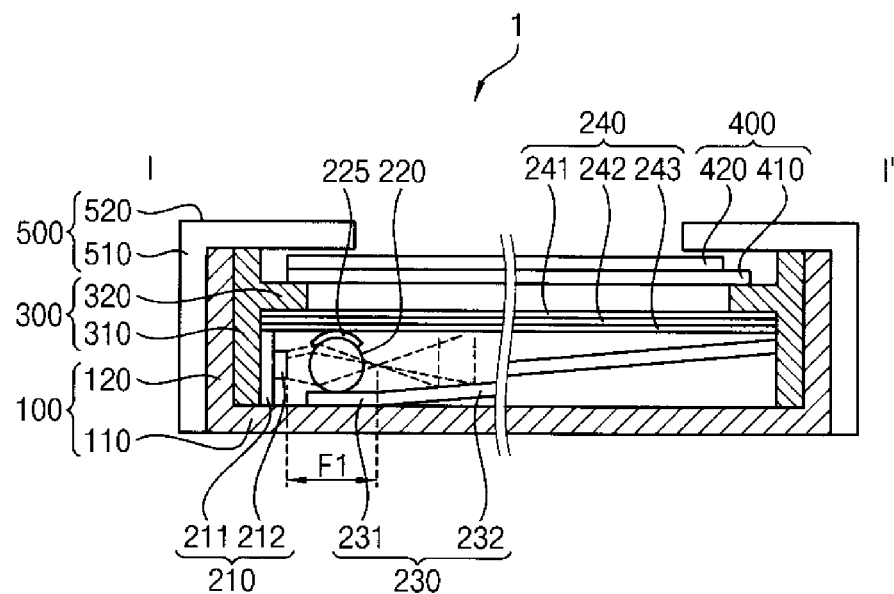
FIG. 2 is a cross-sectional view taken along a line I-I' in FIG. 1.

FIG. 1 is an exploded perspective view illustrating a display apparatus 1 according to an exemplary embodiment of the present invention. FIG. 2 is a cross-sectional view taken along a line I-I' in FIG. 1.

Referring to FIGS. 1 and 2, the display apparatus 1 includes a container 100, a backlight assembly 200, a mold frame 300, a display panel 400, and a cover 500. The container 100 includes a bottom plate 110 and a sidewall 120. The sidewall 120 extends from the bottom plate 110 and at least partially defines a space with the bottom plate 110. The container 100 receives the backlight assembly 200, the mold frame 300, and the display panel 400 in the space. As illustrated in figures, the space has a rectangular shape, but is not limited thereto.

The backlight assembly 200 is received by the container 100, is disposed under the display panel 400, and provides light to the display panel 400. A detailed description of the backlight assembly 200 will be provided later.

The mold frame 300 has a frame shape and includes a first opening 330. The mold frame 300 includes a side portion 310 forming the frame shape, and an extension 320 extending from the side portion 310 toward the first opening 330. The extension 320 supports the display panel 400. The mold frame 300 is received by the container 100. An optical unit 240 is disposed on a lower surface of the extension 320. The light from the backlight assembly 200 passes through the first opening 330 and is provided to the display panel 400.

The display panel 400 includes a first substrate 410 and is disposed on an opposing second substrate 420. The display panel 400 displays an image using the light provided by the backlight assembly 200.

The cover 500 includes a side cover 510 and an upper cover 520. The side cover 510 has a frame shape and includes a second opening 530. The upper cover 520 extends from the side cover 510 toward the second opening 530, and partially covers an upper portion of the display panel 400. The image from the display panel 500 is provided through the second opening 530.

In the present exemplary embodiment, the backlight assembly 200 includes a light source 210, a light guide 220, a first reflector 230, and an optical unit 240, and may further include a second reflector 225.

The light source 210 includes a base substrate 211 and point light sources 212 mounted on the base substrate 211. In the present exemplary embodiment, the point light sources 212, for example, may be light emitting diodes (LEDs). When the point light sources 212 are LEDs, the base substrate 211 may be an LED printed circuit board (PCB) to drive the LED. The base substrate 211 is mounted on the side portion 310 of the mold frame 300, as illustrated in FIG. 2, but alternatively may be mounted on the bottom plate 110 of the container 100.

The light source 210 longitudinally extends along the side portion 310 of the mold frame 300. The point light sources 212 are disposed along the side portion 310. The point light sources 212 are spaced apart from each other by a constant distance.

The light guide 220 is disposed adjacent to the light source 210, and extends substantially parallel with the longitudinal direction of the light source 210. Thus, the light guide 220 extends substantially parallel with the side portion 310 of the mold frame 300.

The light guide 220 refracts the light emitted from the light source 212. The light emitted from the point light source 212 is radiated in multiple directions. Thus, the light is scattered, which means that the light has 'a relatively larger angle of a light-emitting direction'.

However, in an edge-illumination type backlight assembly of the present exemplary embodiment, the light from the point light source 212 disposed at the edge should be provided to an entire surface of the display panel uniformly. Thus, the light is emitted from the point light source 212 in multiple directions and should be controlled to radiate more linearly. For example, the angle of the direction of the light emitted from the point light source should be reduced.

Referring to the advancing direction of the light as illustrated in FIG. 2, the light guide 220 refracts the light emitted from the point light source 212, and thus the angle of the direction of the light may be narrowed. Thus, the light passing through the light guide 220 advances to relatively farther positions with high luminance, and thus the luminance of the light from the display panel 400 may be more uniform.

Here, the light refracted by the light guide 220 advances with a focal distance F1, and the focal distance F1 may be controlled by changing a distance between the light source 210 and the light guide 220. Thus, the distance between the light source 210 and the light guide is controlled considering a size and an inner structure of the display apparatus. Thus, the luminance of the light provided to the display panel may be improved.

The light guide 220 is generally cylindrical and has a circular width-wise cross-section. The light guide 220 may include a transparent material such as polymethylmethacrylate (PMMA) or polycarbonate (PC).

The first reflector 230 is disposed on a lower surface of the light guide 220, and reflects the light refracted by the light guide 220 toward the display panel 400, which is disposed over the first reflector 230. The first reflector 230 includes a first reflective surface 231 and a second reflective surface 232 extending from the first reflective surface 231. The first reflective surface 231 makes contact with the light guide 220, and extends substantially parallel with an extending direction of the bottom plate 110 of the container 100. Thus, the first reflective surface 231 and the light guide 200 may be attached with each other more strongly.

The second reflective surface 232 obliquely extends with respect to the bottom surface 110 toward the optical unit 240. For example, as the second reflective surface 232 extends away from the light guide 220, the second reflective surface 232 becomes closer to the optical unit 240. Since the luminance of the light decreases as the distance from the light guide 220 increases, the second reflective surface 232 is inclined to enhance the luminance of the light provided to the display panel 400. Thus, the light may be more uniformly applied to the optical unit 240.

Although not shown in the figure, a diffusive ink may be uniformly formed on the first and second reflective surfaces 231 and 232 of the first reflector 230. Thus, the reflectiveness of the light and the diffusion of the light incident into the first reflector 230 may be enhanced.

The optical unit 240 is disposed over the first reflector 230, and a vacant space is formed between the optical unit 240 and the first reflector 230. In the present exemplary embodiment, the light guide plate is omitted between the first reflector 230 and the optical unit 240, and thus the vacant space is formed between the first reflector 230 and the optical unit 240, which is called as an air guide structure. Thus, the angle of the direction of the light emitted from the light source 210 should be reduced using the light guide 220.

The optical unit 240 includes a protective sheet 241, a prism sheet 242, and a diffusive sheet 243, to enhance quality of the light provided to the display panel 400. The optical unit 240 is supported by an upper surface of the light guide 220. For example, a lower surface of the light guide 220 makes contact with the first reflector 230, and the upper surface of the light guide 220 makes contact with the optical unit 240 to support the optical unit 240. Thus, an additional supporting element may be omitted and thus the display apparatus 1 may be more structurally stabilized with a simple structure.

A second reflector 225 may be disposed between the light guide 220 and the optical unit 240. The second reflector 225 may be disposed on the upper surface of the light guide 220 as illustrated in FIG. 2. In the present exemplary embodiment, the light guide 220 has a circular cross-section. Thus, the second reflector 225 partially covers the light guide 220 and has a curved shape matching the curved surface of the light guide 220.

The second reflector 225 is formed on the light guide 220. Thus, the light emitted from the light source 212 is prevented from passing through the light guide 220 and directly advancing to the display panel 400, without being refracted by the light guide 220. Accordingly, a hot spot may be prevented and the image quality of the display panel 400 may be enhanced.

Figure 3A:
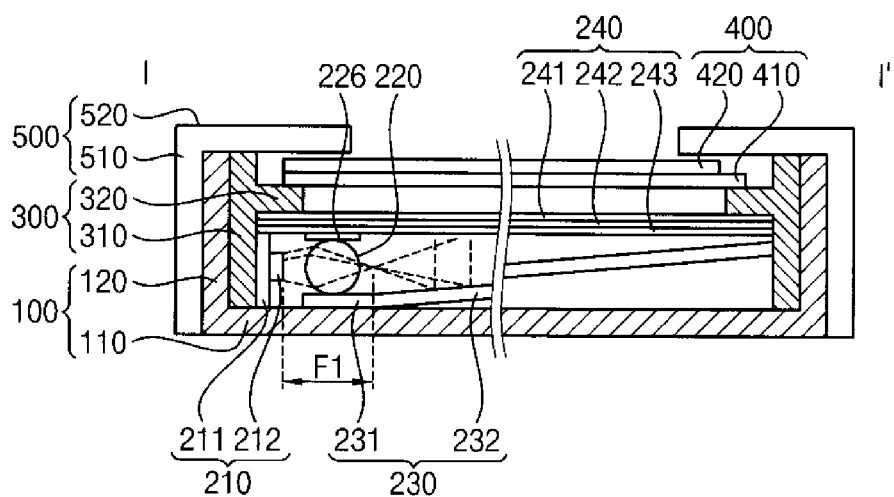
FIGS. 3A, 3B, 3C and 3D are cross-sectional views illustrating examples of a light guide of FIG. 1.

FIGS. 3A, 3B, 3C, and 3D are cross-sectional views illustrating examples of a light guide of FIG. 1. Referring to FIG. 3A, a second reflector 226 is not formed on the upper surface of the light guide 220. Instead, the second reflector 226 is formed on a lower surface of the optical unit 240. For example, the second reflector 226 is formed on a lower surface of the diffusion sheet 243 of the optical unit 240 and is generally planar. Thus, the second reflector 226 may be effective substantially same as the second reflector 225 in FIG. 2.

Figure 3B:
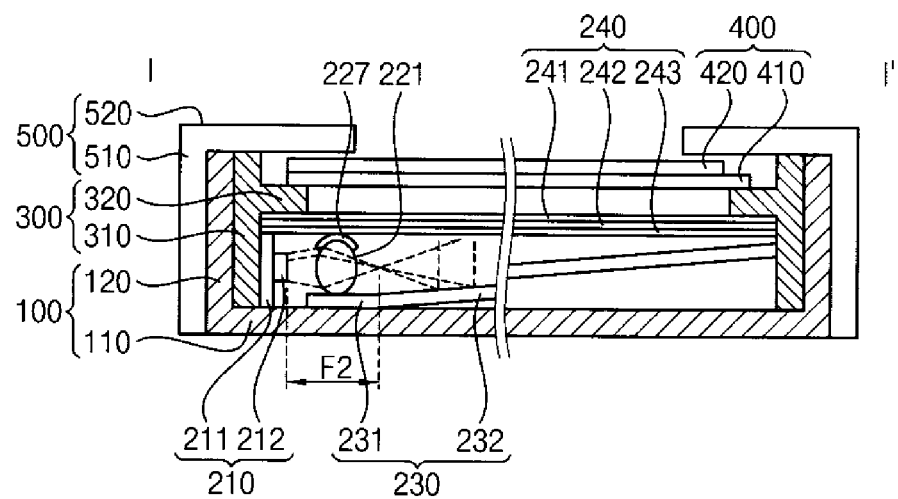

Referring to FIG. 3B, a light guide 221 has an elliptical-cylindrical shape, i.e., is cylindrical and has an elliptical cross-section. For example, a major axis of the light guide 221 extends substantially parallel with an extending direction of the sidewall 120 of the container 100.

The elliptical cross-section of the light guide 221 is elongated in a direction extending away from the bottom plate 110. Thus, when the light guide 221 is adjacent to the light source 210, as illustrated in FIG. 3B, a focal distance F2 of the light is decreased, as compared to the focal distance F1 of the light in the light guide 220 having the cylindrical shape. In addition, a second reflector 227 formed on the upper surface of the light guide 221 has the curved shape corresponding to the curved shape of the light guide 221.

Figure 3C:
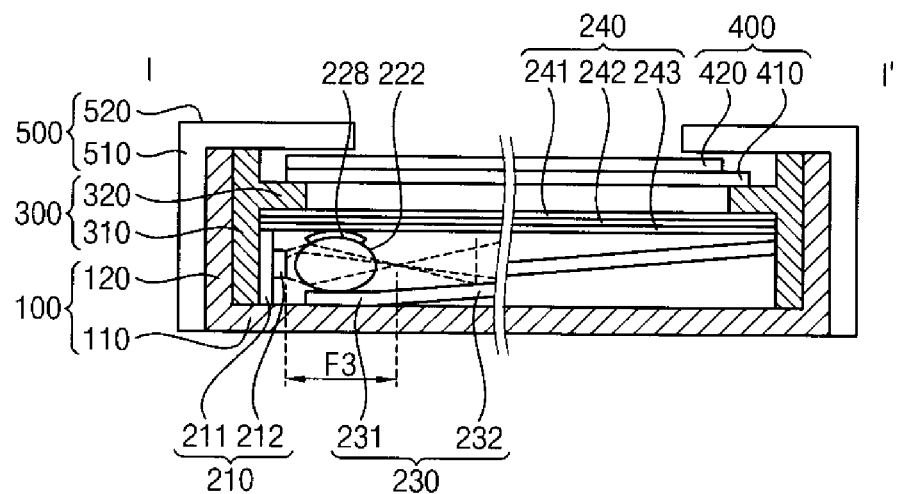

Referring to FIG. 3C, a major axis of a light guide 222 extends substantially parallel with the plane of the bottom plate 110 of the container 100 and has an elliptical cross-section. The elliptical cross-section of the light guide 222 is elongated in a direction parallel to the plane of the bottom plate 110. Thus, when the light guide 222 is adjacent to the light source 210, as illustrated in FIG. 3C, a focal distance F3 of the light is increased, as compared to the focal distance F1 of the light in the light guide 220 having the cylindrical shape. In addition, a second reflector 228 formed on the upper surface of the light guide 222 has the curved shape corresponding to the curved shape of the light guide 222.

Figure 3D:
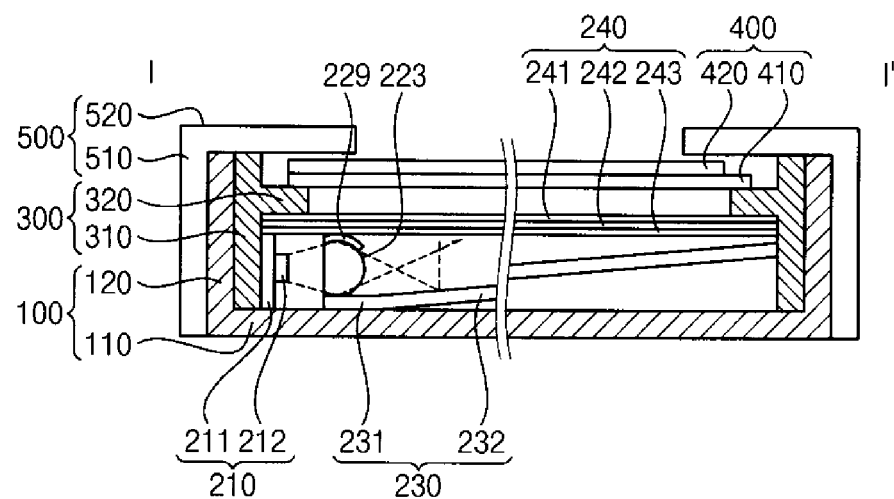

Referring to FIG. 3D, a light guide 223 has a semi-cylindrical shape that is otherwise similar to that of the light guide 220, and is disposed adjacent to the light source 210. Here, a curved surface of the light guide 223 faces away from the light source 210. Although not shown in the figure, even though light guides having various shapes, as illustrated in FIGS. 3B, 3C, and 3D, second reflectors may be disposed on the lower surface of the diffusion sheet 243, instead of being formed on the upper surface of a corresponding light guide.

In addition, although not shown in the figure, the light guides having the elliptical-cylindrical shape as illustrated in FIGS. 3B and 3C may be substituted for the light guide having a semi-elliptical cylindrical shape shown in FIG. 3D. Here, the curved surface of the light guide may face away from the light source, as explained with reference to FIG. 3D.

Figure 4:
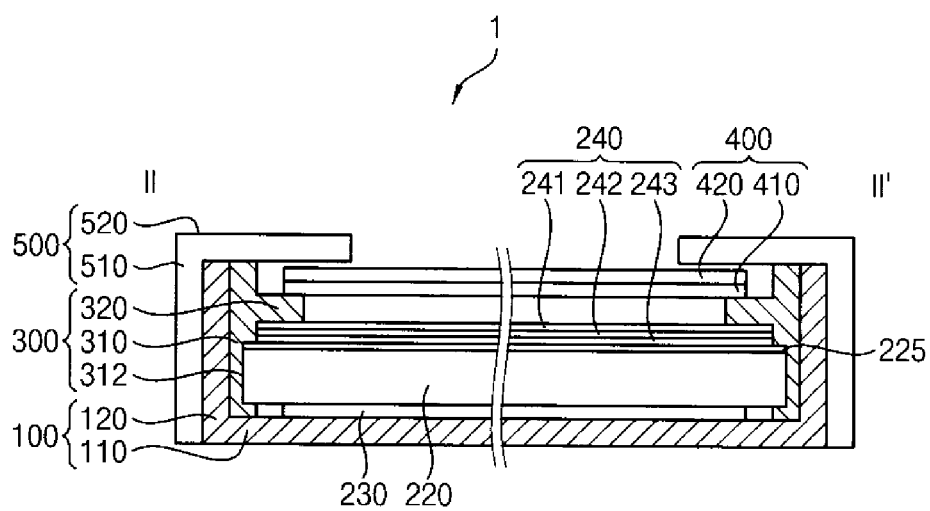
FIG. 4 is a cross-sectional view taken along a line II-II' in FIG. 1.

FIG. 4 is a cross-sectional view taken along a line II-II' in FIG. 1. Referring to FIG. 4, both end portions of the light guide 220 are fixed to the mold frame 301. For example, the side portion 310 of the mold frame 300 includes first fixing grooves 312. The light guide 220 is adjacent to the light source 210 and extends substantially parallel with the extending direction of the light source 210. The light source 210 is fixed at the side portion 310 of the mold frame 300. Thus, to fix both end portions of the light guide 200 to the first fixing grooves 312, the first fixing grooves 312 should be formed at opposing side portions 310. Here, the opposing side portions 310 respectively extend from ends of the side portion 310, at which the light source 210 is fixed.

Accordingly, both end portions of the light guide 220 are fixed in the fixing grooves 312 of the mold frame 300. Thus, an additional fixing element for fixing the light guide 220 may be omitted, and the display apparatus 1 may be structurally stabilized with a simple structure.

Figure 5:
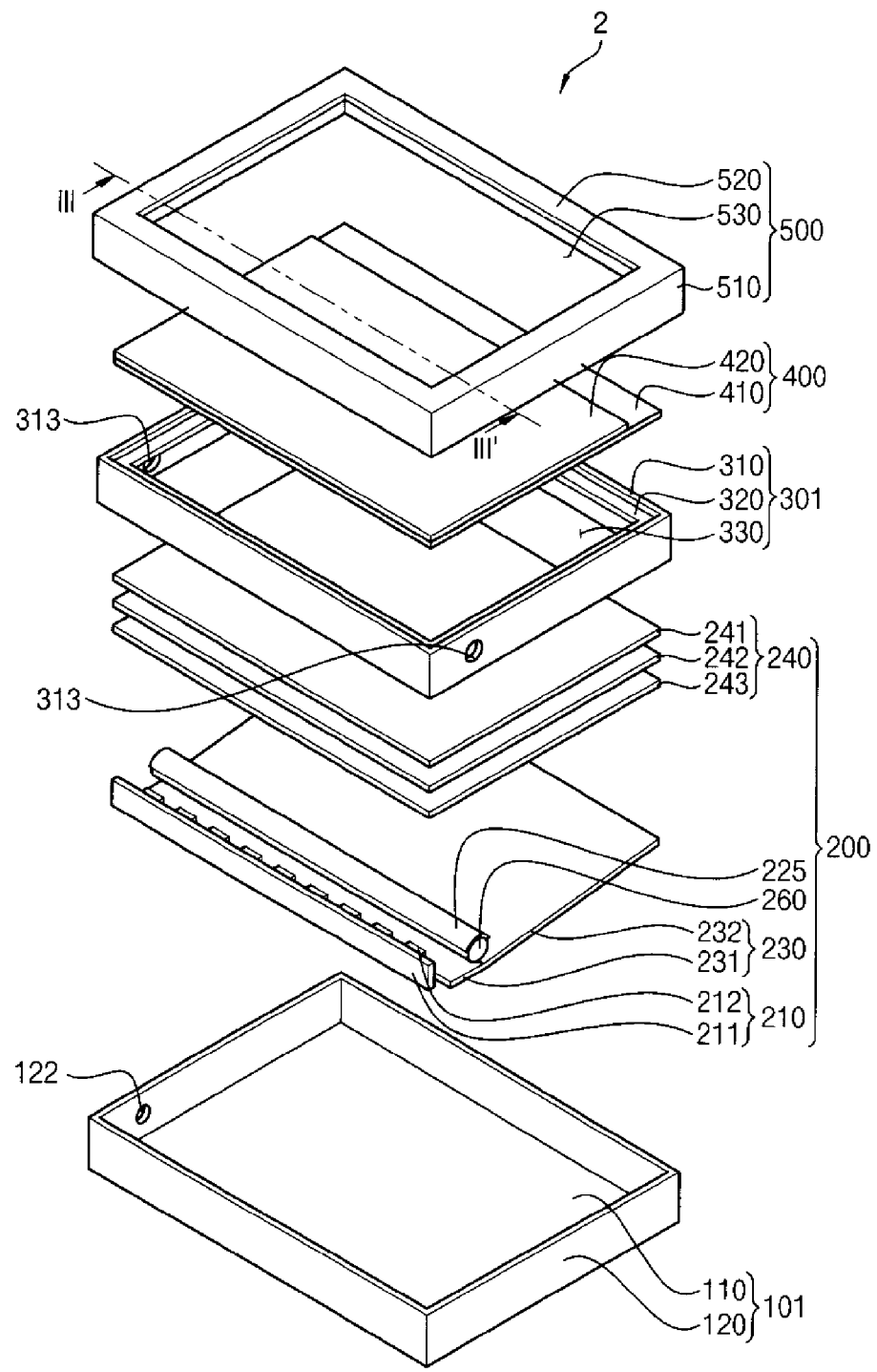
FIG. 5 is an exploded perspective view illustrating a display apparatus according to an exemplary embodiment of the present invention.
Figure 6:
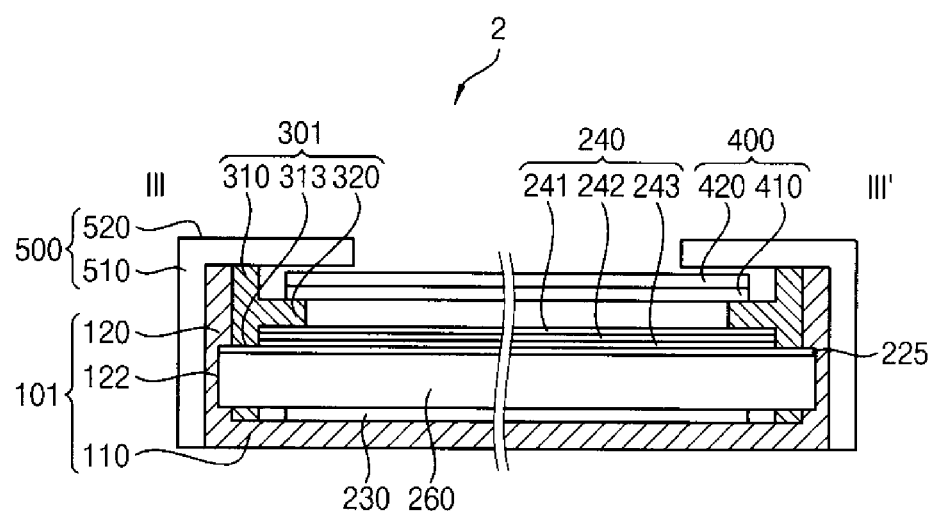
FIG. 6 is a cross-sectional view taken along a line III-III' in FIG. 5.

FIG. 5 is an exploded perspective view illustrating a display apparatus 2 according to an exemplary embodiment of the present invention. FIG. 6 is a cross-sectional view taken along a line III-III' in FIG. 5. The display apparatus 2 is substantially same as the display apparatus 1, except for a fixing structure of a light guide 260, a mold frame 301, and a container 101. Thus, the same reference numerals are used for same elements and repetitive explanation will be omitted.

Referring to FIGS. 5 and 6, both end portions of the light guide 260 are fixed to the mold frame 301 and the container 101. For example, the side portion 310 of the mold frame 301 includes first fixing holes 313, and the sidewall 120 of the container 101 includes second fixing grooves 122. Thus, both end portions of the light guide 260 are inserted into and supported by the first fixing holes 313, and are fixed at the second fixing grooves 122.

The light guide 260 is disposed adjacent to the light source 210 and extends substantially parallel with the extending direction of the light source 210. The light source 210 is fixed to the side portion 310 of the mold frame 301. Thus, for both end portions of the light guide 260 to pass through the first fixing holes 313 and be fixed to the second fixing grooves 122, the first fixing holes 313 are formed to face each other, and the second fixing grooves 122 are formed to face facing each other at corresponding positions. The side portions 310 face each other and extend from both end portions of the side portion 310.

Accordingly, both end portions of the light guide 260 are fixed through the first fixing holes 313 and are fixed at the second fixing grooves 122. Thus, an additional fixing element for fixing the light guide 260 may be omitted, and the display apparatus 1 may be structurally stabilized with a simple structure.

Figure 7:
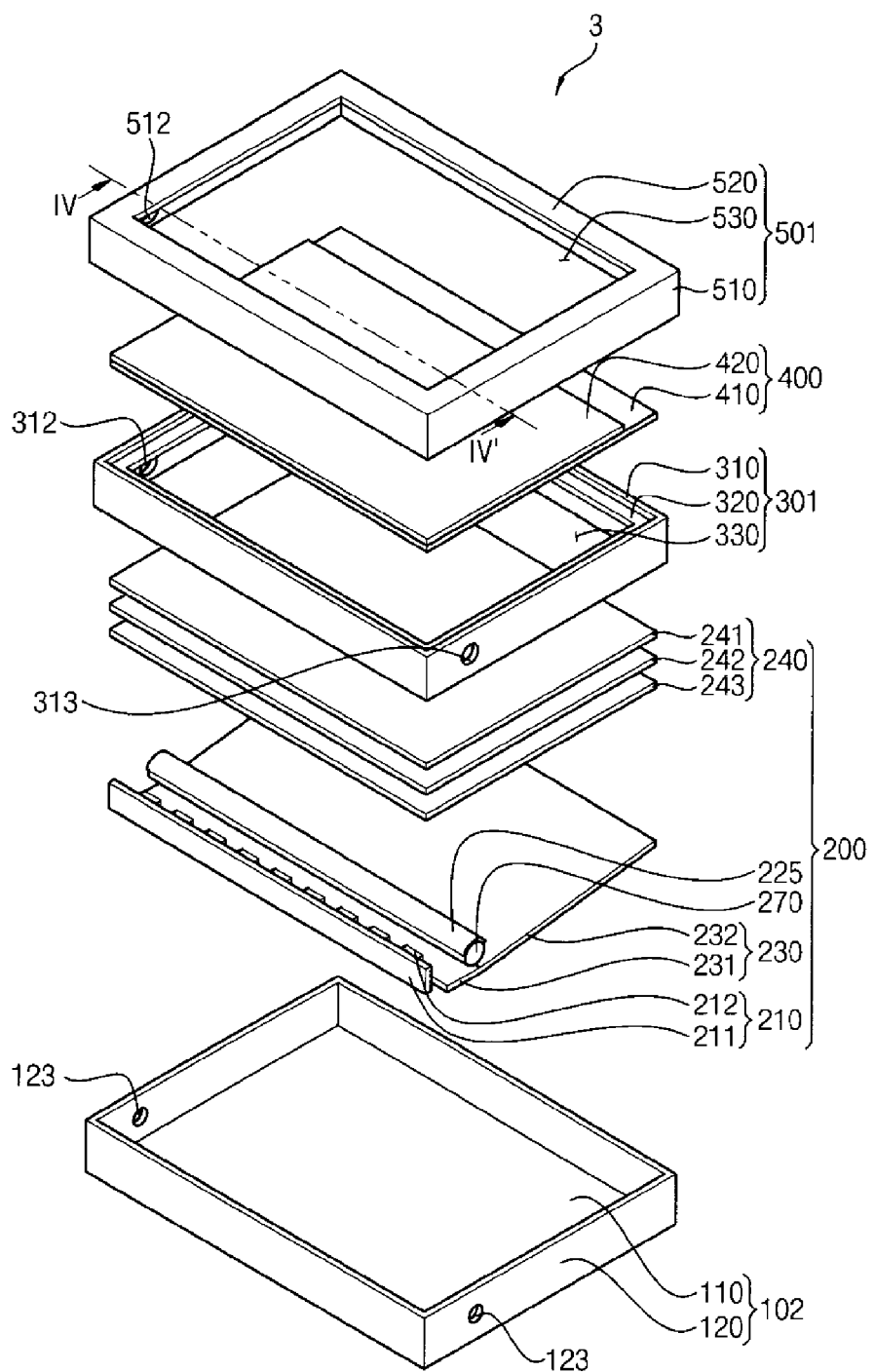
FIG. 7 is an exploded perspective view illustrating a display apparatus according to an exemplary embodiment of the present invention.
Figure 8:
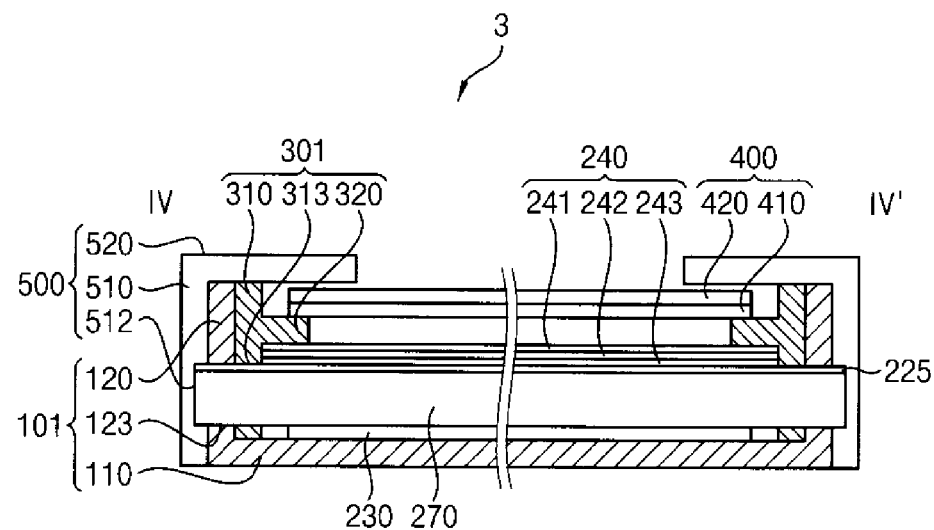
FIG. 8 is a cross-sectional view taken along a line IV-IV' in FIG. 7.

FIG. 7 is an exploded perspective view illustrating a display apparatus 3 according to an exemplary embodiment of the present invention. FIG. 8 is a cross-sectional view taken along a line IV-IV' in FIG. 7. The display apparatus 3 is substantially same as the display apparatus 1, except for a fixing structure of a light guide 270, a mold frame 301, a container 102, and a cover 501. Thus, the same reference numerals are used for same elements and repetitive explanation will be omitted.

Referring to FIGS. 7 and 8, both end portions of the light guide 270 are fixed to the mold frame 301, the container 102, and the cover 501. For example, the side portion 310 of the mold frame 301 includes first fixing holes 313, the sidewall 120 of the container 102 includes second fixing holes 123, and the side cover 510 includes third fixing grooves 512. Thus, the end portions of the light guide 270 pass through, are inserted into, and are supported by, the first and second fixing holes 313 and 123, and are fixed in the third fixing groove 512.

The light guide 270 is disposed adjacent to the light source 210 and extends substantially parallel with the extending direction of the light source 210. The light source 210 is fixed at the side portion 310 of the mold frame 301. Thus, for both end portions of the light guide 270 to pass through the first and second fixing holes 313 and 123 and be fixed in the third fixing groove 512, the first fixing holes 313 are formed to face each other, the second fixing holes 123 are formed to face each other, and the third fixing grooves 512 are formed to face each other.

Accordingly, both end portions of the light guide 270 are fixed through the first fixing holes 313 formed through the side portions 310 of the mold frame 301 and through the second fixing holes 123 formed through the sidewalls 120 of the container 102, and are fixed in the third fixing grooves 512 formed in the side cover 510 of the cover 501.

Figure 9:
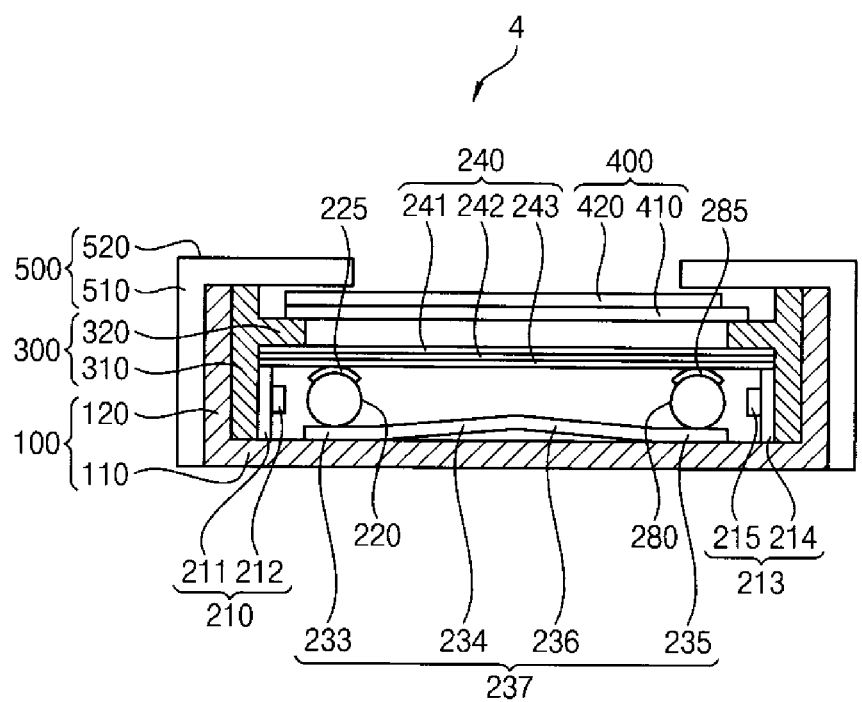
FIG. 9 is a cross-sectional view illustrating a display apparatus according to an exemplary embodiment of the present invention.

FIG. 9 is a cross-sectional view illustrating a display apparatus 4 according to an exemplary embodiment of the present invention. The display apparatus 4 is substantially same as the display apparatus 1, except for the structure of a backlight assembly. Thus, the same reference numerals are used for the same elements and repetitive explanation will be omitted.

Referring to FIG. 9, the backlight assembly according to the present exemplary embodiment includes a pair of light sources that face each other and a pair of light guides that face each other. For example, a first light source 210 includes a first base substrate 211 and first point light sources 212, and is disposed on the side portion 310 of the mold frame 300. A second light source 213 includes a second base substrate 214 and second point light sources 215, and is disposed on the side portion 310 of the mold frame 300. The second light source 213 faces the first light source 210.

A first light guide 220 is disposed adjacent to the first light source 210, and a second light guide 280 faces the first light guide 220 and is disposed adjacent to the second light source 213. A third reflector 285 is disposed adjacent to the second light guide 280. Thus, the light emitted from the first light source 210 is refracted by the first light guide 220 and advances at a reduced angle in a light-emitting direction. In addition, the light emitted from the second light source 213 is refracted by the second light guide 280 and advances at a reduced angle in a light-emitting direction.

A first reflector 237 includes a first reflective surface 233, a second reflective surface 234, a third reflective surface 235, and a fourth reflective surface 236. The first reflective surface 233 extends substantially parallel with the bottom plate 110 and makes contact with a lower surface of the first light guide 220. The second reflective surface 234 obliquely extends from the first reflective surface 233 toward the optical unit 240. The second reflective surface 234 is inclined with respect to the bottom plate 110. The third reflective surface 235 extends substantially parallel with the bottom plate 110 and makes contact with a lower surface of the second light guide 280. The fourth reflective surface 236 obliquely extends from the third reflective surface 236 toward the optical unit 240. The fourth reflective surface 236 is inclined with respect to the bottom plate 110. The fourth reflective surface 236 is connected to the second reflective surface 234 at an apex of the first reflector 237.

Thus, the first and second reflective surfaces 233 and 234 mainly reflect the light passing through and refracted by the first light guide 220, to radiate the light toward the display panel 400. In addition, the third and fourth reflective surfaces 235 and 236 mainly reflect the light passing through and reflected by the second light guide 280, to radiate the light toward the display panel 400. Accordingly, the display apparatus 3 according to the present exemplary embodiment includes a pair of light sources and a pair of light guides and thus the luminance may be more enhanced.

According to the exemplary embodiments of the present invention, the light guide is disposed adjacent to the light source and refracts the light from the light source, and thus an angle of a light-emitting direction of the light source may be decreased. Thus, luminance of the light provided to the display panel may be more uniformized.

In addition, in an air guide structure in which a light guide plate is omitted and a vacant space is formed between the optical unit and the first reflector, the angle of the light-emitting direction is decreased and thus the light is uniformly provided to the first reflector. Thus, the luminance of the light provided to the display panel may be more uniformized.

In addition, a distance between the light source and the light guide, a shape of the light guide, and so on, may be variously changed to change a focal distance of the light passing through the light guide. Thus, the luminance may be optimized based on the structure and the size of the display apparatus.

In addition, the second reflector is disposed between the light guide and the optical unit to block the light from passing through the light guide and being provided upwardly. Thus, a hot-spot may be prevented.

In addition, an upper surface of the light guide makes contact with a lower surface of the optical unit and supports the optical unit. Thus, the display apparatus may have excellent structural stability.

In addition, the light guide is formed at an inner portion of the light source. Thus the luminance may be more uniform without increasing thickness of a bezel due to the light guide.

In addition, both ends of the light guide are fixed by the mold frame, the container or the cover portion, and thus an additional fixing element may be unnecessary. Thus, the display apparatus may be more structurally stabilized with a simple fixing element.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight assembly comprising:
a first light source to emit light;
a substantially cylindrical first light guide extending lengthwise, substantially parallel with the first light source and configured to refract the emitted light;
a first reflector disposed adjacent to the first light guide and configured to reflect the refracted light; and
an optical unit configured to receive the reflected light and is-disposed over the first reflector such that a space is formed between the optical unit and the first reflector,
wherein the first light guide is configured to focus the light into an area between the first reflector and the optical unit, before the light diverges and is then reflected by the first reflector.

2. The backlight assembly of claim 1, wherein the optical unit is disposed on the upper surface of the first light guide.

3. The backlight assembly of claim 2, further comprising a second reflector disposed between the optical unit and the first light guide and configured to reflect light away from the optical unit.

4. The backlight assembly of claim 3, wherein the second reflector is attached to the lower surface of the optical unit.

5. The backlight assembly of claim 3, wherein the second reflector is attached to the upper surface of the first light guide.

6. The backlight assembly of claim 1, wherein the first light guide comprises a transparent material.

7. The backlight assembly of claim 1, wherein the first light guide has a circular width-wise cross-section.

8. The backlight assembly of claim 1, wherein the first light guide has an elliptical width-wise cross-section.

9. The backlight assembly of claim 1, wherein the first light guide has a semi-circular width-wise cross-section.

10. The backlight assembly of claim 9, wherein the first light guide has a curved surface that faces away from the light source.

11. The backlight assembly of claim 1, wherein the first reflector comprises:
a first reflective surface that contacts the first light guide and extends substantially parallel with the optical unit; and
a second reflective surface that extends obliquely from the first reflective surface, toward the optical unit.

12. The backlight assembly of claim 1, further comprising:
a second light source; and
a second light guide configured to receive light from the second light source,
wherein the first light source and the first light guide are disposed at a first side of the first reflector, and the second light source and the second light guide are disposed at an opposing second side of the first reflector.

13. The backlight assembly of claim 12, wherein the first reflector comprises:
a first reflective surface that contacts the first light guide and that extends substantially parallel with the optical unit;
a second reflective surface extending obliquely from the first reflective surface and angled toward the optical unit;
a third reflective surface that contacts the second light guide and that extends substantially parallel with the optical unit; and
a fourth reflective surface extending obliquely from the second reflective surface and the third reflective surface, toward the optical unit.

14. The backlight assembly of claim 1, wherein the light source comprises a base substrate and a light emitting diode (LED) disposed on the base substrate.

15. A display apparatus comprising:
a display panel configured to display an image;
a mold frame configured to support the display panel;
a backlight assembly configured to provide light to the display panel; and
a container disposed under the backlight assembly and configured to house the display panel, the mold frame, and the backlight assembly,
wherein the backlight assembly comprises:
a light source to emit light;
a substantially cylindrical light guide disposed adjacent to the light source, extending lengthwise, substantially parallel with a longitudinal direction of the light source, and configured to refract the light emitted from the light source;
a first reflector disposed under the light guide and configured to reflect the refracted light toward the display panel; and
an optical unit configured to receive the reflected light and disposed over the is first reflector such that an empty space is formed between the optical unit and the first reflector,
wherein the light guide is configured to focus the light into an area between the first reflector and the optical unit, before the light diverges and is then reflected by the first reflector.

16. The display apparatus of claim 15, wherein the mold frame comprises first fixing grooves in which opposing ends of the light guide are fixed.

17. The display apparatus of claim 15, wherein:
the mold frame comprises first fixing holes; and
the container comprises second fixing grooves,
wherein opposing ends of the light guide are respectively inserted into the first fixing holes and fixed to the second fixing grooves.

18. The display apparatus of claim 15, further comprising a cover that is disposed on the container and covers the display panel, the mold frame, and the backlight assembly, the cover comprising third fixing grooves, wherein,
the mold frame comprises first fixing holes,
the container comprises second fixing holes, and
opposing ends of the light guide are inserted into the first and second fixing holes and fixed in the third fixing grooves.

19. A display apparatus comprising:
a display panel configured to display an image;
a mold frame configured to support the display panel; and
a backlight assembly disposed adjacent to the display panel and comprising:
a light source to emit light;
a substantially cylindrical light guide disposed adjacent to the light source and configured to refract the emitted light;

a first reflector disposed under the light guide and configured to reflect the refracted light toward the display panel; and an optical unit configured to receive the reflected light, wherein a distance between the first reflector and the optical unit decreases as a distance between a corresponding portion of the first reflector and the light source increases, and wherein the light guide is configured to focus the light into an area between the first reflector and the optical unit, before the light diverges and is then reflected by the first reflector.

\* \* \* \* \*